United States Patent [19]

Clayton

[11] Patent Number: 5,439,151
[45] Date of Patent: Aug. 8, 1995

[54] CARGO CARRIER ATTACHMENT FOR A VEHICLE

[76] Inventor: Kenneth C. Clayton, 3811 - 150th St., Brooklyn, Iowa 52211

[21] Appl. No.: 252,402

[22] Filed: Jun. 1, 1994

[51] Int. Cl.⁶ .............................................. B60R 9/058
[52] U.S. Cl. ..................... 224/509; 224/282; 224/521; 224/529; 296/37.1; 280/769
[58] Field of Search ................. 224/42.03 A, 42.03 B, 224/42.03 R, 42.08, 42.21, 42.43, 42.44, 42.01, 282; 280/769; 296/37.1, 37.6, 3

[56] References Cited

U.S. PATENT DOCUMENTS

| | | | |
|---|---|---|---|
| 1,113,845 | 10/1914 | Stevens | 296/37.1 |
| 3,103,290 | 9/1963 | Perri | 214/450 |
| 3,202,332 | 8/1965 | Walker | 224/42.03 |
| 3,381,835 | 5/1968 | Lee | 414/462 |
| 3,650,443 | 3/1972 | Haskett et al. | 224/42.03 |
| 4,465,423 | 8/1984 | Anderson | 414/462 |
| 4,671,439 | 6/1987 | Groeneweg | 224/42.03 |
| 4,744,590 | 5/1988 | Chesney | 280/769 |
| 4,771,926 | 9/1988 | Anderson et al. | 224/42.13 |
| 5,015,025 | 5/1991 | Henriquez | 296/37.6 |
| 5,033,662 | 7/1991 | Godin | 224/42.43 |
| 5,038,983 | 8/1991 | Tomososki | 224/42.43 |
| 5,106,002 | 4/1992 | Smith et al. | 224/42.03 |
| 5,310,100 | 5/1994 | Liscinsky | 224/42.01 |

*Primary Examiner*—J. Casimer Jacyna
*Assistant Examiner*—Peter S. Hrycko
*Attorney, Agent, or Firm*—Zarley, McKee, Thomte, Voorhees & Sease

[57] ABSTRACT

A cargo carrier for a vehicle includes a frame having an elongated front jaw, a U-shaped rear jaw having a first end pivotally attached to one end of the front jaw along a vertical pivot axis. The second end of the rear jaw is releasably secured to the other end of the front jaw so as to enclose a space between the closed jaws. The carrier further includes a hitch tongue for releasably cantilevering the frame to the vehicle. A container for cargo is releasably secured to at least one of the frame jaws and has a base portion which extends into the space between the jaws and an upper portion which protrudes from the jaws in the closed position. The container has at least one catch/holddown mechanism disposed below an outwardly protruding ledge on the base portion. In one embodiment, horizontal holddown indentations disposed along the outer periphery of the base portion are engaged by catch pins protruding from one or more of the jaws to hold the container thereon, in the absence of outside forces, whether the jaws are pivoted open or closed. With the jaws closed around the container, it is secured within the frame and ready for transport with the vehicle. Because the jaws pivot open, the container can be slidingly installed on or removed from the frame without tools.

15 Claims, 5 Drawing Sheets

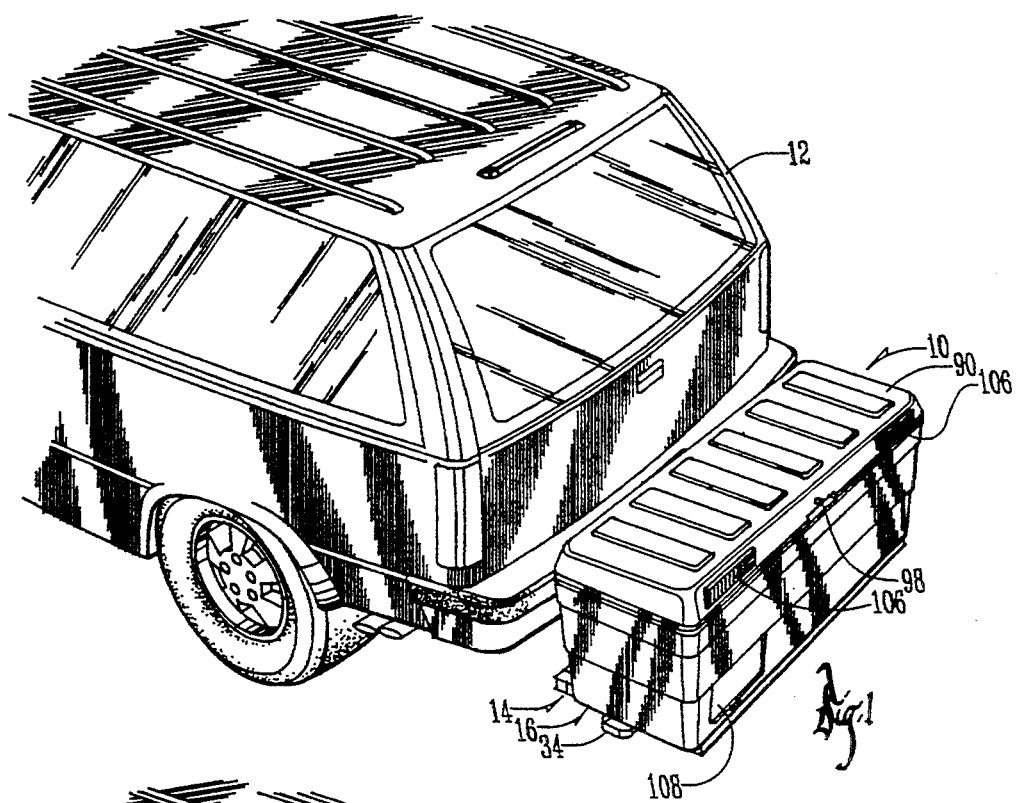
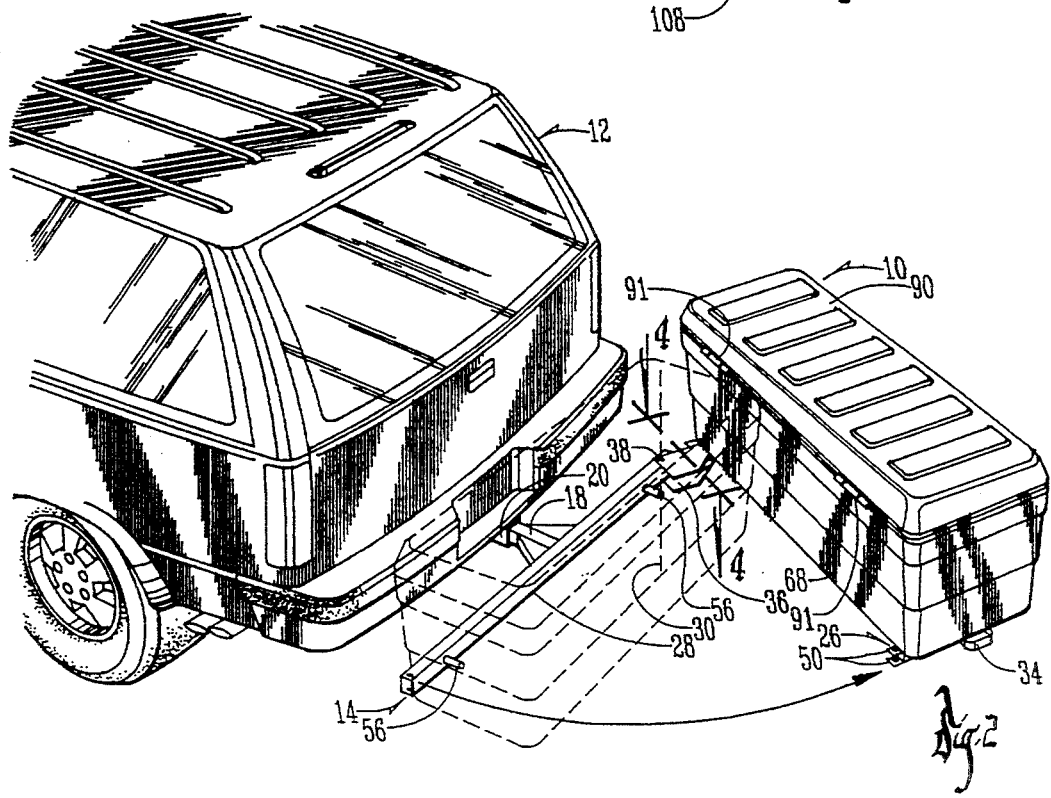

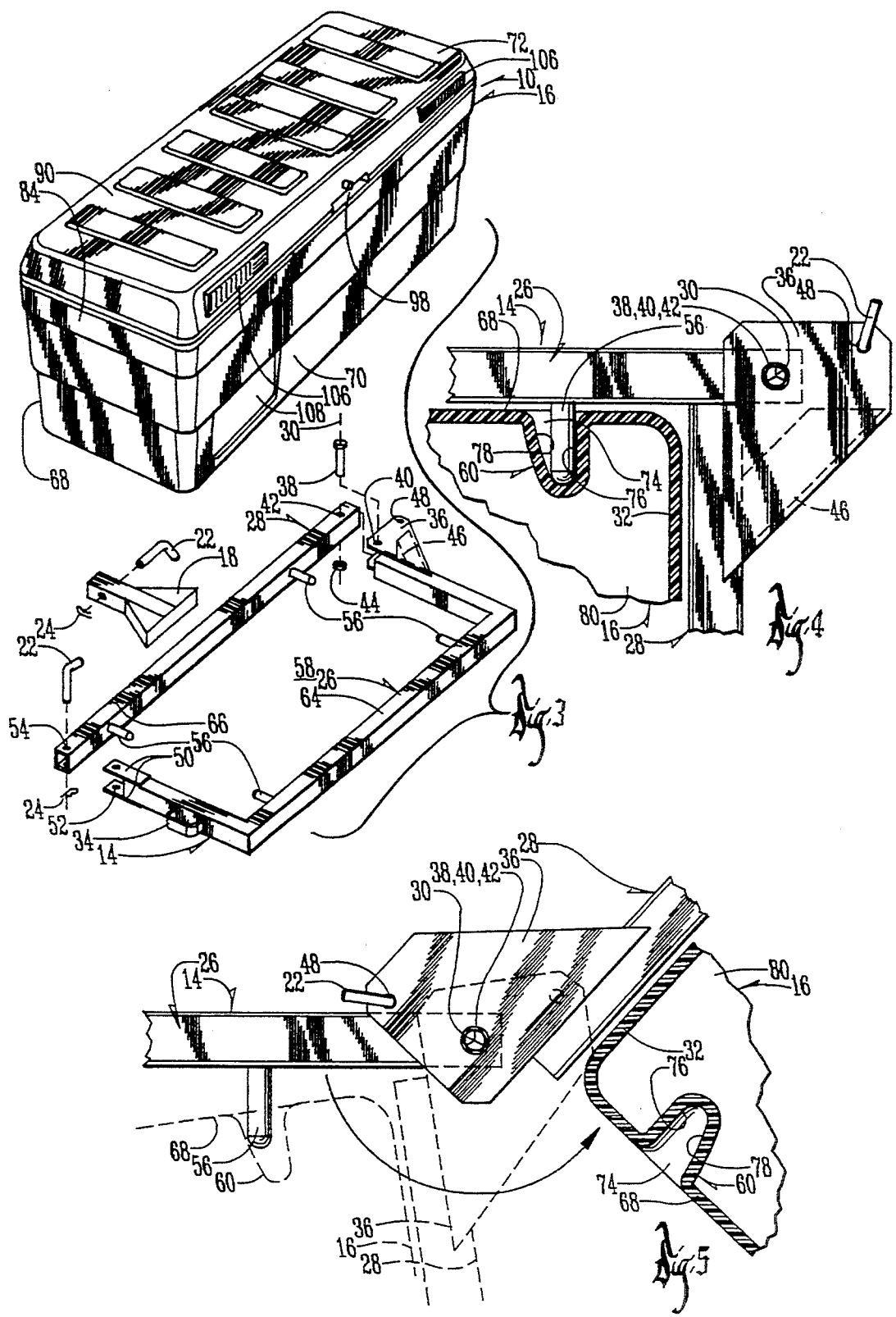

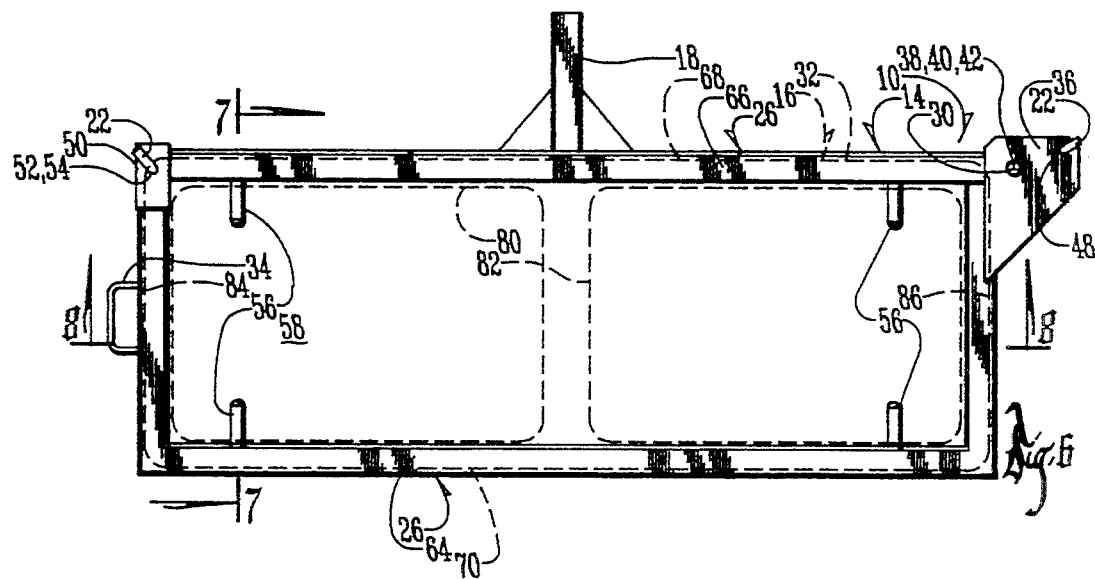
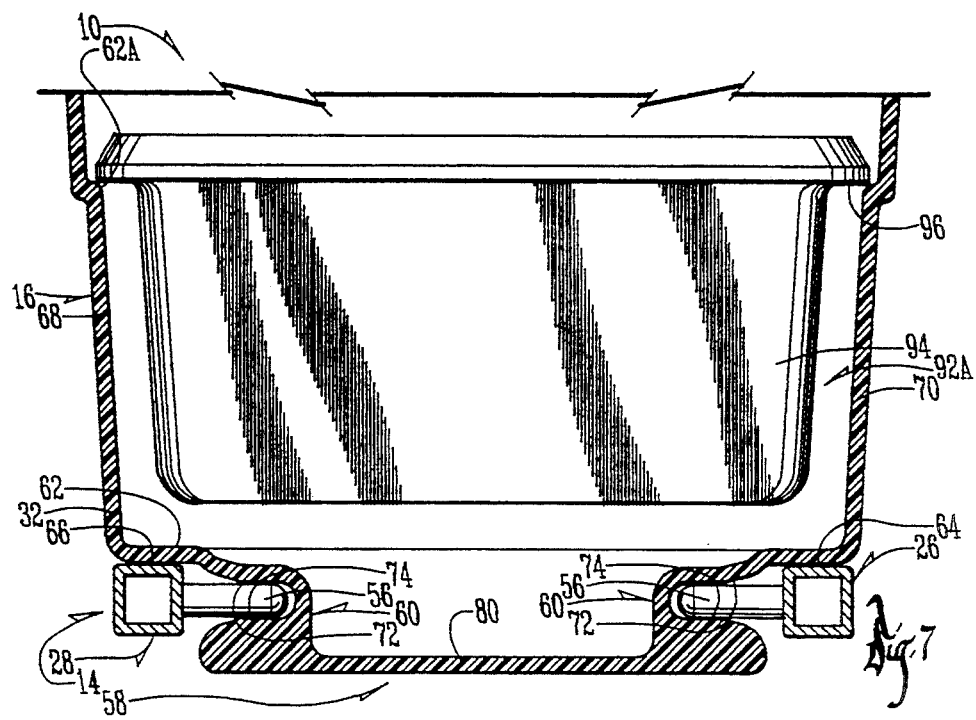

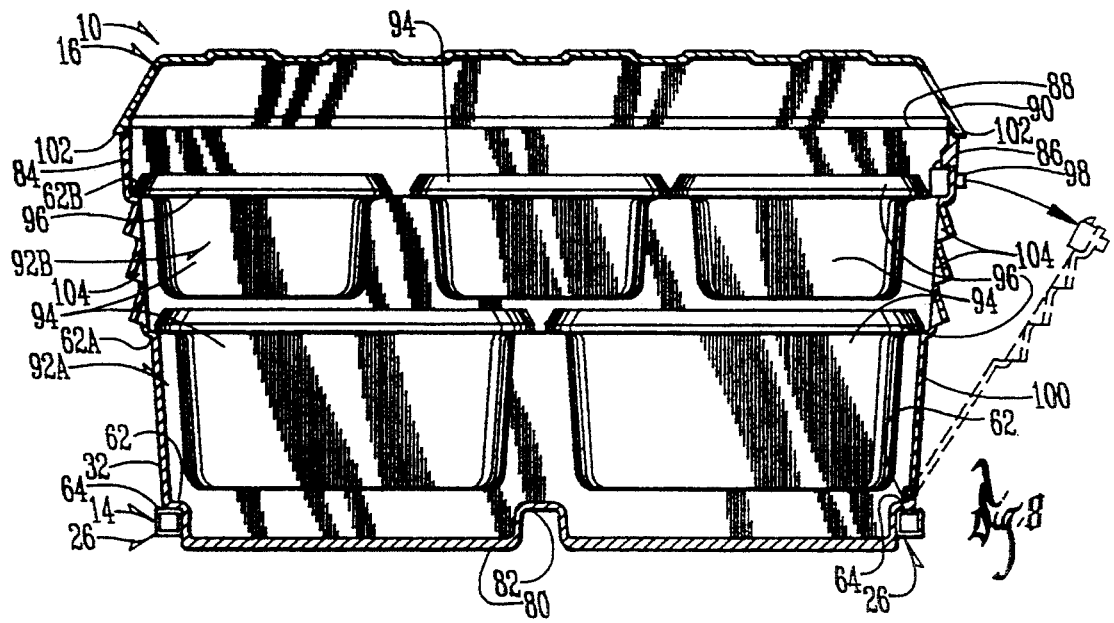
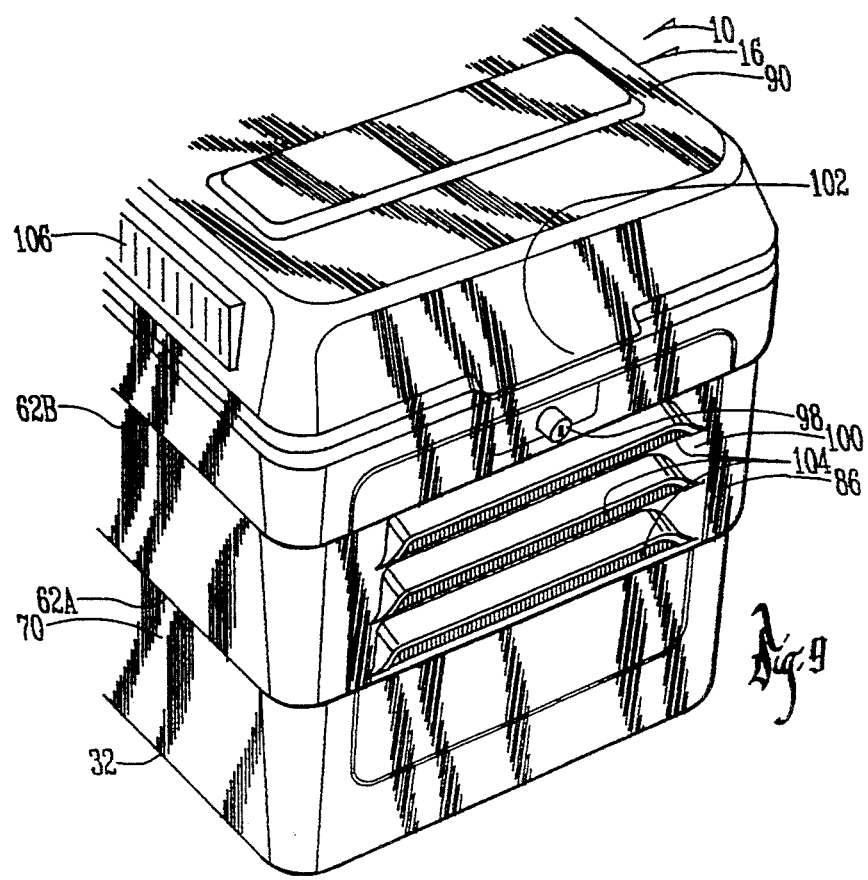

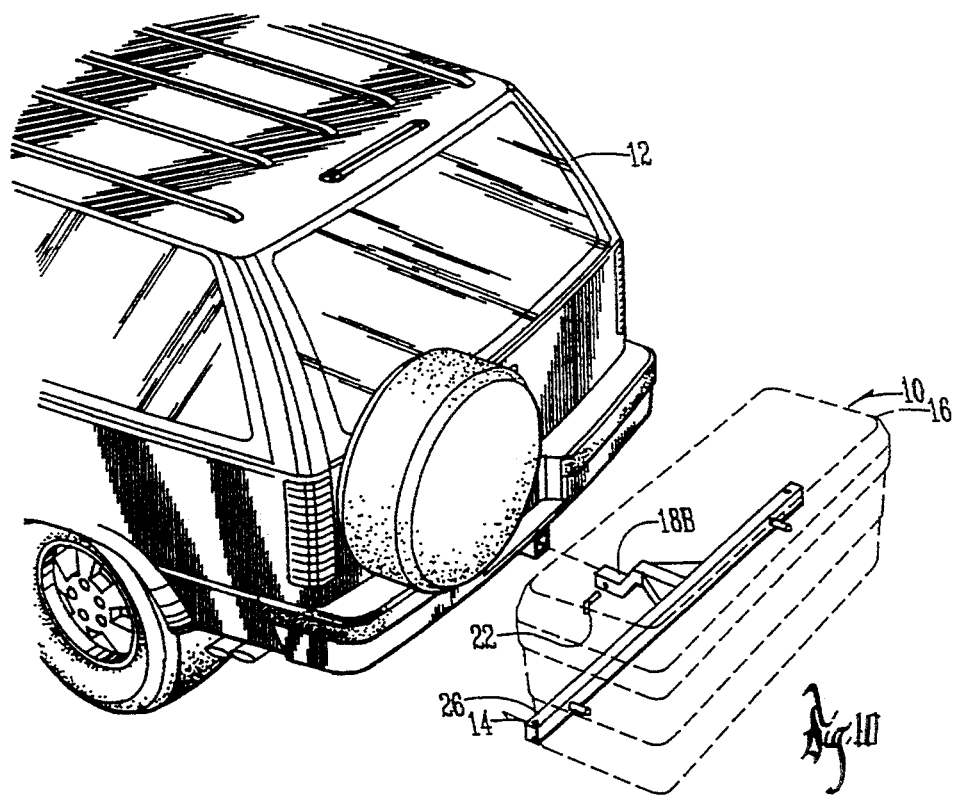
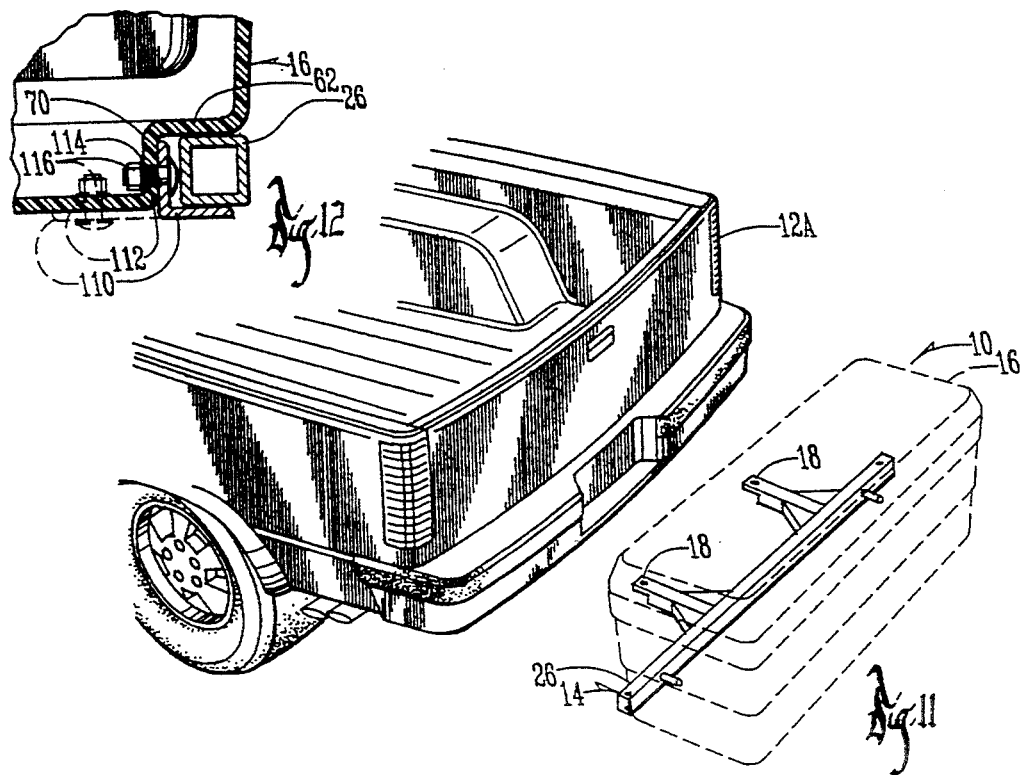

CARGO CARRIER ATTACHMENT FOR A VEHICLE

BACKGROUND OF THE INVENTION

This invention relates to storage boxes (also known as cargo carriers) mounted on vehicles. More particularly, the present invention relates to a cargo carrier attachment cantilevered by a trailer hitch to the vehicle and pivotal about a generally vertical axis away from the vehicle.

Motorized vehicles, such as cars, trucks, and vans often transport both people and cargo. Occasionally, the cargo to be carried may exceed the space available inside the vehicle or, in other instances, it may be desirable to separate the cargo from the passengers. For bulky or heavy cargo, a wheeled cart or trailer may be towed behind the vehicle. However, fuel economy is typically poor because of the horsepower requirements and aerodynamics of such cargo hauling carts or trailers.

Where the weight and bulk of the cargo are not significant with respect to the size of the vehicle, cargo carriers rigidly mounted to the roof of the vehicle are known to be useful. However, roof-mounted cargo carriers may present a overhead clearance problem on some vehicles. Furthermore, the aerodynamics and fuel economy typically suffer with a roof-mounted cargo carrier.

U.S. Pat. No. 5,038,983, which issued to Tomososki on Aug. 13, 1991, discloses a cargo carrier rigidly mounted to a trailer hitch at the rear of the vehicle. The rigid mounting of the carrier and the container thereon impairs access to the trunk of sedan vehicles, the tailgates of pickup trucks, or the rear door of vans. The cargo carrier disclosed by Tomososki also partially blocks access to the spare tire typically mounted at the rear of a van. Attachment of the carrier is not particularly convenient due the rigidly mounted container.

Therefore, a primary objective of the present invention is the provision of an improved cargo carrier for vehicles.

Another objective of this invention is the provision of a cargo carrier which is cantilevered to the vehicle and pivotable about a vertical axis spaced apart from the vehicle to provide better access to both the storage box and the vehicle therebehind.

Another objective of this invention is to provide a cargo carrier which is adaptable to carry small animals including pets such as dogs, cats, and birds.

A further objective of this invention is provide a rear-mounted cargo carrier which leaves the driver's vision through the rearview mirror of the vehicle substantially unobstructed.

Another objective of this invention is to provide a cargo carrier attachment from which the storage box or container is easily separable without the use of tools.

Another objective of this invention is the provision of a cargo carrier which will withstand various road and weather conditions.

Another objective of this invention is to provide a cargo carrier which may be locked to secure the contents.

Another objective of this invention is to provide a streamlined cargo carrier which has minimal adverse impact on aerodynamics and fuel economy.

A further objective of this invention is to provide a cargo carrier which is interposed between the rear bumper and rear window of the vehicle so as to discourage road grime from accumulating on the rear window.

Another objective of this invention is to provide a cargo carrier attachment which the user can quickly and easily insert into a trailer hitch mounted on the vehicle without having to stand between the attachment and the vehicle.

A further objective of this invention is to provide a cargo carrier which can be equipped with reflectors, brake lights, and license plates as required by local laws.

Another objective of this invention is to provide a cargo carrier which is durable in use and economical to manufacture.

A further objective of this invention is to provide a cargo carrier which provides a plurality of segregated levels of storage compartments therein.

These and other objects will be apparent from the description which follows.

SUMMARY OF THE INVENTION

The present invention is a cargo carrier which attaches to a vehicle by a releasably cantilevered connection such as a trailer hitch. The cargo carrier has no supporting wheels of its own. The cargo carrier includes a container removably mounted on a frame. The frame includes a front jaw having a tongue attached thereto for cantilevered mounting to the vehicle in a generally horizontal attitude. A U-shaped rear jaw has one of its ends pivotally attached to one end of the front jaw for pivotal movement about a vertical pivot axis spaced away from the vehicle. The second end of the rear jaw is releasably secured to the other end of the front jaw so as to enclose a space between the jaws for receiving and releasably securing the base portion of the container.

The cargo container is insertable between the jaws when they are pivoted to an open position. In one embodiment, the container includes a base having generally horizontal holddown indentations in the outer periphery thereof which matingly engage catch pins mounted on the jaws along the inside perimeter of the frame. In another embodiment, the base has one or more L-shaped brackets attached thereto. Each bracket has a vertical leg attached to the base and a horizontal leg protruding therefrom. The horizontal leg coacts with a lower ledge of the container just above the base to form a channel for receiving the jaw member and releasably mounting the container thereto. Thus, the container is releasably mounted on the frame without the use of tools. Both of the catch/holddown embodiments accommodate, rather then detract from, the pivoting of the container away from the vehicle. At the same time, vertical movement of the container relative to the jaws is prevented.

After the container is slidably engaged with one of the open jaws, the jaws can be pivoted closed and secured to one another. Thus, the container is held securely between the jaws for subsequent loading and transport. The pivotable frame allows the container to be swung aside to access the trunk, spare tire, or trailer hitch on the vehicle. Therefore, the carrier frame can be attached to the vehicle without putting the user in the perilous position of having to stand between the frame and the vehicle. Furthermore, when the frame is pivoted open, the container can be removed completely without the aid of tools.

BRIEF DESCRIPTION OF THE DRAWINGS

FIG. 1 is a perspective view of the cargo carrier of the present invention mounted at the rear of a vehicle, with the carrier being in a closed transport position.

FIG. 2 is a perspective view of the cargo carrier of this invention showing the frame members, in an open pivoted position for removal of the container or access to the rear of the vehicle.

FIG. 3 is an exploded assembly view of the cargo carrier of this invention.

FIG. 4 is an enlarged partial sectional view of the cargo carrier in a closed position taken along line 4—4 in FIG. 2.

FIG. 5 is an enlarged partial sectional view similar to FIG. 4 showing the carrier in an open position.

FIG. 6 is a top plan view of the frame of this invention in the closed position with the container which is releasably secured thereby shown in dashed lines.

FIG. 7 is a partial sectional view taken along line 7—7 in FIG. 6 showing the container engaged by the frame in a closed position.

FIG. 8 is a sectional view of the container of the present invention taken along line 8—8 in FIG. 6.

FIG. 9 is a perspective view of the end of the container showing the drop door.

FIG. 10 is a perspective view of an alternate embodiment of the present invention wherein an S-shaped tongue is used to mount the carrier frame, thus simultaneously elevating the container and spacing it away from the vehicle.

FIG. 11 is a perspective view of another alternate embodiment of the present invention wherein dual tongues are used to mount the cargo carrier frame to the frame of a pickup truck.

FIG. 12 is a sectional view showing an alternate embodiment of the catch/holddown mechanism of the present invention.

DETAILED DESCRIPTION OF THE PREFERRED EMBODIMENTS

Like components are identified with the same reference numerals in the figures and in the description which follows.

The cargo carrier attachment of the present invention is generally designated in the drawings by reference numeral 10. In FIG. 1, the cargo carrier 10 is shown attached to the rear of a vehicle 12.

The carrier 10 includes a swinging frame 14 cantilevered from the vehicle 12 to provide support for a cargo container 16. The container 16 is movable with the swinging frame 14 between a closed position shown by dashed lines and an open position shown in solid lines in FIG. 2. An elongated tongue 18 has one end attached to the frame 14 by conventional means, such as welding. Preferably, the other end of the tongue 18 has a square external cross-section adapted for insertion into a conventional square trailer hitch 20 which is conventionally attached to the vehicle 12. FIG. 3 shows that tongue 18 is secured to the trailer hitch 20 by a conventional means, such as a dog-legged pin 22 and spring clip 24 arrangement.

The carrier frame 14 can be flipped 180 degrees about the longitudinal axis of tongue 18, causing the rear jaw member 26 of the frame 14 to pivot in a direction opposite to that shown in FIG. 2. Thus, the carrier can be selectively mounted on the vehicle for either right or left pivoting movement from the closed position to the open position.

Because the carrier frame can be swung open prior to mounting, the container does not obstruct the view of the receiving hitch during mounting of the carrier to the vehicle. In fact, the container can be removed from the frame without the use of tools so that the frame is easier to install on the vehicle. The installer does not have to put themselves in the rather ackward and perilous position of being between the frame and the vehicle in order to ensure that the tongue is guided into the receiving hitch.

The pivotal frame 14 of this invention is shown in greater detail in FIG. 3. The frame 14 includes a front jaw member 28 pivotally connected to a rear jaw member 26 along a generally vertical pivot axis 30 best seen in FIG. 2. The front jaw member 28 is elongated and has top, bottom, front, and rear sides and opposite ends. The tongue 18 is attached to the front side of the front jaw member 28, preferably at right angles and approximately midway between the ends of member 28. Preferably, the tongue 18 and the jaw members 26 and 28 are constructed of rigid, durable, and tubular material, such as two inch square steel tube stock. The steel tube stock is preferred because it is strong and lightweight, and because other components can easily be welded to it.

The rear jaw member 26 also has top, bottom, front and rear sides and opposite ends. As best seen in FIG. 2, the rear jaw member 26 is generally U-shaped and one end is pivotally attached to one end of front jaw member 28. The end of rear jaw member 26 opposite the pivotal connection is releasably attached to the end of the front jaw member 28 remote from the pivotal connection by conventional means, such as a dog-legged pin 22 and spring clip 24 arrangement. A handle 34 is preferably attached to the outer periphery of the rear jaw member 26 to facilitate the swinging of the rear jaw member 26 with respect to the front jaw member 28.

As shown in FIG. 3, offset pivot bracket plates 36 are welded or attached by other conventional means to the top and bottom sides respectively of the pivotal connection end of the rear jaw member 26. Preferably, the offset pivot bracket plates 36 extend beyond the end of the rear jaw member 26 so as to provide a channel between the plates 36 for receiving the front jaw member 28. The offset pivot bracket plates 36 preferably have a generally triangular shape when viewed from the top. The triangular shape helps minimize the weight of the frame and provides the clearances needed for pivoting the frame 14.

A pivot pin or bolt 38 passes through aligned holes 40 in the pivot bracket plates 36 and a hole 42 through the front jaw member 28. The pin 38 defines a generally vertical pivot axis 30 about which the rear jaw member 26 is pivotal with respect to the front jaw member 28. A nut 44 prevents the pivot pin 38 from being dislodged. Offsetting the vertical pivot axis 30 outwardly from the rest of the rear jaw member 26 facilitates the unobstructed pivoting of the member 26 and enhances convenient mounting of the container 16 on the frame 14, as described below. The pivot axis 30 is also spaced away from the vehicle 12.

A stop hole 48 is also provided on one or more of the pivot bracket plates 36 radially remote from the hole 40 for the pivot pin 38. The stop hole 48 is adapted to accept the pin 22. To minimize the number of parts, the same pin which was used to releasably secure the rear jaw member 26 to front jaw member 28 can be transferred to the stop hole prior to swinging the frame 14 open. With the pin 22 installed in the stop hole 48, the rear jaw member 26 of frame 14 stops swinging once the pin 22 contacts the front jaw member 28, as shown in FIG. 5. Thus, the swinging of the frame 14 can be limited so the container 16 does not strike the vehicle 12 in a fully open position of the frame. The stop hole 48 on plate 36 can also be positioned so as to achieve a particular desired maximum jaw opening in degrees. Selection of the degree of jaw opening is also contemplated by inserting the pin 22 in one of a plurality of stop holes 48 provided in each bracket plate. Another embodiment is contemplated wherein a pin is attached to the front jaw member 28 and stops the swinging of the rear jaw member 26 by abutment with one of the bracket plates 36.

As best seen in FIG. 4, a bracket plate support 46 is preferably welded to the rear jaw member 26 and the bracket plates 36 to reinforce the pivotal connection against shear and bending loads.

Two tabs 50 are welded or otherwise suitably attached to the top and bottom sides of the end of rear jaw member 26 that is remote from the pivotal connection. The parallel tabs 50 extend beyond the rear jaw member 26 to form a channel for receiving the front jaw member 28 when the rear jaw member 26 is pivoted into a closed position against the front jaw member 28. The tabs 50 have aligned holes 52 therein. In the closed position of the frame, the holes 52 in tabs 50 are aligned with a corresponding hole 54 through the front jaw member 28 so that the dog-legged pin 22 may be inserted through each of the above-mentioned holes and held by the spring clip 24. Therefore, the rear jaw member 26 is releasably secured to the front jaw member 28 in the closed position of the frame. For added security, any of the pin and spring clip arrangements heretofore discussed can be replaced by conventional padlocks.

In FIGS. 3, 6, and 7, a plurality of protruding catches, such as pins 56, extend from the front and rear jaw members 28, 26. The pins 56 are disposed around the inner periphery of the frame 14 and extend horizontally into a space 58 between the jaw members 26, 28 to engage holddown indentations 60 in the base 32 of container 16. The engagement of the indentations 60 by the pins 50 holds the lower ledge 62 of container 16 tightly down against the top of the frame 14, as best seen in FIG. 7. The base 32 of container 16 is approximately the same size as the space between the jaws 26, 28 of the frame in the closed position. Therefore, the container 16 fits between the jaws 26 and 28 with the lower ledge 62 of the container 16 resting on the top sides 64, 66 of the jaws 26 and 28, respectively. Vertical movement of the container 16 is inhibited by the engagement of the catch pins 56 with the holddown indentations 60.

The container 16 can be slid horizontally onto the rear jaw member 26 when the latter is swung or pivoted outwardly away from the front jaw member 28, so that the container 16 is effectively supported and captured by the three sides of the U-shaped rear jaw member 26, as shown in FIGS. 2 and 6. Because the frame 14 is cantilevered in a generally horizontal attitude of the frame 14, the frictional forces between the container 16, the jaw member 26, and catch pins 56 are sufficient to hold the container on the rear jaw member in the absence of outside forces. The frame 14 can also be inclined downwardly slightly as it extends away from the vehicle to help hold the container 16 on the rear jaw member 26 and reduce the effort required to swing of the frame 14 into an open position. The above-described catch/holddown mechanism, wherein the engagement of the catch pins 56 with the indentations 60 in the base 32 of the container prevents vertical movement of the container 16 relative to the frame 14, is useful in minimizing the shaking and bouncing of the contents of the container during transport.

FIG. 6 illustrates the jaws 26, 28 in a closed position around the base 32 of the container 16. Similar to the rear jaw member 26, the front jaw member 28 has a plurality of generally horizontal protruding catches, such as pins 56 which engage indentations 60 in base 32. Preferably, the catch pins 56 have rounded ends. The catch pins 56 are preferably attached in opposing pairs to the front and rear jaw members 26, 28 respectively. As previously stated, the catch mechanisms are primarily for preventing vertical movement of the container 16 relative to the frame 14 and secondarily for impeding horizontal movement. Therefore, other catch mechanisms involving the base and the jaws are contemplated. For instance, the catch member 56 and 60 could have a quarter-round profile when viewed from the top. The indentations can also comprise horizontally elongated slots extending around all or part of the outer periphery of the container. The indentations 60 would have a complimentary profile.

FIGS. 3 and 4 show the relationship between the catch pin 56 and the base indentation 60 in the closed position of the jaws 26 and 28. The indentation 60 is formed front and rear in the side walls 68, 70 of the base 32 of the container 16 (see also FIG. 7). With respect to the pivot pin 38, indentation 60 has a top 72, a bottom 74, a proximate side 76, and distal side 78. The proximate side 76 extends straight inwardly, perpendicular to the outer side of the base 32. The distal side 78 is angled, or preferably curved, to accommodate the withdrawal of the catch pin 56 from the indentation 60 as the rear jaw member 26 and the container 16 attached thereto are swung outwardly from the front jaw member 28 about pivot pin 38 as shown in FIG. 5.

The container 16 of this invention is preferably constructed of a material which is impermeable to liquids, strong, lightweight, and easily moldable, such as fiberglass or plastic. The container 16 includes a bottom wall 80, preferably having a center support rib 82 which is best seen in FIG. 8. FIGS. 7 and 8 show that the container 16 further comprises opposite end walls 84, 86 and front and rear side walls 68, 70. The side walls 68, 70 and end walls 84, 86 of the container 16 extend in a generally vertical direction upward to a lower ledge 62 and eventually to a top opening 88. A lid 90 for covering the top opening 88 is pivotally attached to one of the side or end walls of container 16. Preferably, the lid 90 is connected by one or more hinges 91 to the front side wall 68 as shown in FIG. 2. The front side wall 68 is nearest to the vehicle when the frame is in the closed position. Therefore, the container lid 90 can be opened without having to open the frame.

From the lower ledge 62 to the top opening 88, the side 68, 70 and end walls 84, 86 of the container 16 are stepped outwardly to form a plurality of storage sections 92A, 92B delimited by generally horizontal ledges 94A, 94B. Thus, the storage sections have progressively larger cross-sectional areas as they are situated closer to the top opening 88. The side walls 68, 70 and end walls 84, 86 may also be drafted so as to facilitate the removal of the container from the mold during fabrication.

In the interior of the container, the ledges 62, 62A, 62B are sufficiently wide and structurally sound so as to support plastic bins 94 having flanges 96 for sliding engagement therewith. In FIG. 9, two large bins 94 are shown suspended from the first intermediate ledge 62A extending around the inside of the container 16. Three smaller bins 94 are suspended from the second intermediate ledge 62B.

The hanging bin system, wherein the bins 94 are suspended by their flanges 96 on interior ledges 62, 62A, 62B, is one of many possible ways to organize the contents and divide the interior of the container 16. Rigid dividers of suitable size made of cardboard, plywood, particle board, plastic, or the like can also be set between the ledges 62, 62A, 62B which surround the interior of the container 16 to define sections of storage for each level 92A, 92B.

One means for access to the interior of the container is provided through the lid 90 which is attached to one of the walls of the container 16, preferably front wall 68, by one or more hinges 91, as seen in FIG. 2. As can be seen from FIGS. 1 and 2, it is generally easier for a person to stand to the rear of the container 16 rather than to the sides or between the frame 14 and the vehicle 12. Therefore, the lid 90 is hinged to open toward the front of the vehicle about a horizontal axis. A spring latch and lock assembly 98 is provided for locking the lid 90 to the rear side wall 70.

As seen in FIGS. 9 and 11, a drop door 100 in one of the end walls 84 or 86 provides an alternate means of accessing the contents of the container. The drop door 100 is preferably connected by a hinge 101 along its lower periphery and has a spring latch and lock assembly 98 for security purposes.

Handles 102 for carrying the container 16 are preferably molded into both of the end walls 84 and 86, as shown in FIGS. 9 and 11. Under the projection of one or more of the handles 102, a ventilation slot 104 can be provided if air circulation is desired inside the container 16. The projection of the handle tends to deflect any moisture away from the slot 104. This feature is useful in an embodiment wherein pets or animals are to be transported in the container. It will be appreciated that the drop door makes it convenient to load small animals. Larger animals may be easier to load by opening the lid 90.

As best seen in FIG. 1, the rear side wall 70 of the container 16 can be equipped with conventional safety devices 106, such as tail lights and/or brake lights. Because the container 16 tends to obscure the rear license plate of the vehicle, a license plate mounting pad 108 is preferably included on the rear side wall 70.

Other means for securing the carrier frame to the vehicle will suffice, so long as the frame is effectively cantilevered to the vehicle and has no supporting wheels of its own. For instance, in the embodiment shown in FIG. 11, dual tongues 18 are attached to the carrier frame 14 and extend under a pickup truck 12A where the dual tongues 18 are conventionally bolted to the frame of the pickup.

In FIG. 10, an alternate embodiment of the present invention provides a tongue 18B having a generally S-shaped side profile. Thus, the frame 14 and container 16 mounted thereon are simultaneously elevated and horizontally spaced apart from the vehicle. This feature is useful in several respects. First, the container is interposed between the bumper and the rear window of the vehicle. The container 16 tends to deflect road grime away from the rear window when so positioned by the S-shaped tongue 18B. Elevating the container above the bumper of the vehicle also tends to make it easier for adult humans to access the contents without stooping. Of course, the elevation of the container is limited by the fact that visibility out the rear window for the driver must be maintained. Some vehicles have spare tires mounted on the rear of the vehicle. Although access to such rear-mounted spare tires is not problematic with the pivoting frame of the present invention, the horizontal spacing of the carrier frame away from the rear bumper allows the carrier attachment to be installed on vehicles having rear-mounted spare tires.

An alternate embodiment of the catch/holddown mechanism is disclosed in FIG. 12. FIG. 12 is similar to FIG. 7, except that an attachment bracket 110 is mounted to the bottom wall 80 (see dashed lines) or, in the case of an L-shaped bracket, to the rear side 70 (see solid lines) of the container 16 at its base 32 by one or more bolts 112, lock washers 114 and nuts 116. A portion of the bracket 110 protrudes in a generally horizontal direction away from the base 32 and extends generally parallel to lower ledge 62. Thus, the horizontal portion of bracket 110 and the lower ledge 62 form a channel for receiving rear jaw member 26 when the container 16 is slid into engagement with jaw member 26. When the container 16 and jaw member 26 are engaged as shown, the horizontal portion of bracket 110 restrains the container 16 from vertical movement relative to the jaw member 26. Frictional forces between the jaw member 26, the bracket 110, and lower ledge 62 also tend to impede the horizontal movement of the container 16 in the absence of outside forces. The container 16 is effectively secured to the jaw member 26 in this manner. Of course, a mirror image of this catch/holddown mechanism can be provided on the front side wall 68 of container 16, if desired to hold the container 16 down on jaw 28. Furthermore, this catch/holddown mechanism can be positioned along the end walls 84, 86 of the container 16.

In use, the closed frame 14 of the present invention is installed into the receiving trailer hitch 20 on the vehicle in the proper orientation for the desired direction of swing. The tongue 18 is inserted into the receiving trailer hitch 20, the pin 22 is installed, and the spring clip 24 is attached thereto. Next, the spring clip 24 is removed from the pin 22 which joins the jaw members. Thereafter, the last-mentioned pin 22 is withdrawn and preferably transferred to the stop hole 48 located in the pivot bracket plates 36. By grasping the handle 34 of the frame, the rear jaw member 26 is pivoted or swung away from the front jaw member 28 until the pin 22 in the stop hole 48 stops further movement. Next, the preferably empty container 16 is then lifted from the side on which the hinges 91 for the lid 90 are located and the base 32 of the container 16 is slid into the open U-shaped rear jaw member 26. Subsequently, base 32 is pushed back firmly against the rear jaw member 26 so that the catch/holddown mechanism secures the jaw member 26 with indentations in the base 32 of the container 16.

The rear jaw member 26, with the container 16 mounted thereon, is swung toward the end of front jaw member 28 which is opposite of the pivot axis 30. As the frame 14 fully closes, the catch/holddown mechanism at the front side wall 70 of the container 16 receives the front jaw member 28, and the front jaw member 28 comes flush against the base 16 just below ledge 62. The pin 22 is removed from the stop hole 48 and inserted into the aligned tab holes 40 and hole 42 to secure the jaw members 26, 28 together, whereby the container 16 is prevented from any substantial movement relative to the frame 14. At this point, cargo can be loaded into the container 16 through the lid 90 or the drop door 100 as desired. Finally, the lid 90 and drop door 100 are closed and locked prior to transporting the cargo with the vehicle.

Whereas the present invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A cargo carrier for a vehicle, comprising:
a swingably openable frame spaced outwardly apart from the vehicle and mounted adjacent and normally generally parallel to the vehicle, the frame including an elongated front jaw member having opposite first and second ends and a U-shaped rear jaw member having a first end pivotally attached along a generally vertical pivot axis to the first end of the front jaw member for angular relative movement between open and closed positions in a substantially horizontal plane, the rear jaw member having a second end releasably secured to the second end of the front jaw member so as to define a space between the jaw members upon the pivoting of the rear jaw member to the closed position; and
a container for holding cargo releasably secured to at least one of the jaw members of the frame and having a base portion extending into the space between the jaw members and an upper portion protruding from the frame in the closed position of the jaw members.

2. The cargo carrier of claim 1 wherein a handle is provided on one of the jaw members for swinging the jaw member about the pivot axis into an open position of the frame.

3. The cargo carrier of claim 1 wherein the tongue is substantially S-shaped such that the frame and the container secured on the frame are elevated above the cantilevered end of the tongue and spaced apart from the vehicle.

4. The cargo carrier of claim 1 wherein two tongues are attached to the frame and releasably cantilevered to the vehicle.

5. The cargo carrier of claim 1 wherein the container has a ledge portion disposed between the base portion and the upper portion, the ledge portion being adapted for resting on one of jaw members.

6. A method of transporting cargo adjacent to a vehicle, comprising:
releasably cantilevering a frame to the vehicle, the frame having a pair of jaws pivotal between open and closed positions;
pivoting the jaws of the frame to the open position;
inserting a container into a position within one of the jaws;
pivoting the jaws of the frame to the closed position such that the container is held between the jaws; and
loading the container with cargo.

7. The method of claim 6 wherein the inserting of the container into the position within one of the jaws is accomplished without the use of tools.

8. A cargo carrier for a vehicle, comprising:
a frame including an elongated front jaw member having opposite first and second ends and a U-shaped rear jaw member having a first end pivotally attached to the first end of the front jaw member for movement between open and closed positions, the rear jaw member having a second end releasably secured to the second end of the front jaw member so as to define a space between the jaw members upon the pivoting of the rear jaw member to the closed position;
at least one tongue member attached to one of the jaw members and being adapted to extend into releasable cantilevered engagement with the vehicle to support the frame; and
a container for holding cargo releasably secured to at least one of the frame members and having a base portion extending into the space between the jaw members, the container including a bottom wall, side walls attached to the bottom wall and forming a top opening, and a lid pivotally attached to one of the side walls for covering the top opening, and wherein an outwardly protruding ledge is formed on at least one of the walls and therebelow at least one catch/holddown mechanism is operatively interposed between at least one of the jaw members and one of the walls having the ledge so as to form a channel for securing the container to the jaw member, such that the container is restrained against vertical movement relative to the frame in the open position and in the closed position of the frame yet can be slid horizontally to detach from the frame in the open position.

9. The cargo carrier of claim 8 wherein each catch/holddown mechanism comprises a protrusion from the respective jaw member and a complementary horizontally disposed slot in the side wall which receives the protrusion.

10. The cargo carrier of claim 8 wherein each catch/holddown mechanism comprises an elongated, horizontally disposed pin extending from the jaw members and an indentation disposed in the container for receiving the pin.

11. The cargo carrier of claim 8 wherein the container has an aperture in one of the side walls and a drop door is pivotally connected to the container and positioned to cover the aperture.

12. The cargo carrier of claim 8 wherein at least one of the walls and lid includes a vent therein which allows air into the container yet keeps fluids out, whereby animals can be carried in the container as cargo.

13. The cargo carrier of claim 8 wherein a pair of handles for carrying are integrally formed in the side walls of the container.

14. The cargo carrier of claim 8 wherein each catch/holddown mechanism comprises a bracket having one portion attached to one of the walls and another portion extending generally horizontally therefrom to form a channel for receiving one of the jaw members.

15. The cargo carrier of claim 8 wherein the bracket is generally L-shaped with one generally vertical leg attached to one of the side walls and a generally horizontal leg extending generally parallel to the ledge to form a channel for receiving one of the jaw members.

* * * * *